United States Patent
Soupikov et al.

(10) Patent No.: US 8,933,943 B2
(45) Date of Patent: Jan. 13, 2015

(54) TECHNIQUE FOR PERFORMING LOAD BALANCING FOR PARALLEL RENDERING

(75) Inventors: Alexei Soupikov, Novgorod (RU); Alexander Reshetov, Saratoga, CA (US); Dmitry Pyadushkin, Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1238 days.

(21) Appl. No.: 12/154,804

(22) Filed: May 27, 2008

(65) Prior Publication Data

US 2009/0303245 A1 Dec. 10, 2009

Related U.S. Application Data

(60) Provisional application No. 61/049,411, filed on Apr. 30, 2008.

(51) Int. Cl.
| | |
|---|---|
| G06F 15/80 | (2006.01) |
| G06F 15/16 | (2006.01) |
| G06F 9/46 | (2006.01) |
| G06T 15/00 | (2011.01) |
| G09G 5/36 | (2006.01) |

(52) U.S. Cl.
CPC .............. *G06T 15/005* (2013.01); *G09G 5/363* (2013.01); *G09G 2360/06* (2013.01)
USPC .......................... 345/505; 345/502; 718/105

(58) Field of Classification Search
CPC ............. G09G 2352/00; G06T 15/005; G06T 2210/52
USPC ........... 345/501–503, 505, 530, 557; 718/105
See application file for complete search history.

(56) References Cited

U.S. PATENT DOCUMENTS

| | | | | |
|---|---|---|---|---|
| 5,794,016 | A * | 8/1998 | Kelleher | 345/505 |
| 5,815,646 | A * | 9/1998 | Purcell et al. | 345/502 |
| 6,742,086 | B1 * | 5/2004 | Cotugno et al. | 711/141 |
| 6,753,878 | B1 * | 6/2004 | Heirich et al. | 345/629 |
| 6,754,773 | B2 * | 6/2004 | Ulrich et al. | 711/118 |
| 7,053,893 | B1 * | 5/2006 | Molnar et al. | 345/426 |
| 7,075,541 | B2 * | 7/2006 | Diard | 345/505 |

* cited by examiner

*Primary Examiner* — Joni Richer
(74) *Attorney, Agent, or Firm* — Trop, Pruner & Hu, P.C.

(57) ABSTRACT

A technique to promote load balancing in parallel graphics rendering. In one embodiment, one or more threads are associated with one or more rendering tiles and scheduled in a balanced manner on one or more graphics processing resources.

6 Claims, 7 Drawing Sheets

TECHNIQUE FOR PERFORMING LOAD BALANCING FOR PARALLEL RENDERING

FIELD OF THE INVENTION

Embodiments of the invention relate generally to the field of information processing and more specifically, to the field of graphics and throughput application processing.

BACKGROUND

Graphics rendering is becoming increasingly more complex as more features are supported and more content-rich scenes are able to rendered. In order to increase throughput, rendering may be performed in multiple sequences of instructions ("threads") performed in parallel. However, some threads may use more processing resources than others, causing some resources to be over-used and rendering performance to suffer, while other processing resources are under-used, thereby creating a relatively inefficient use of processing resources.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
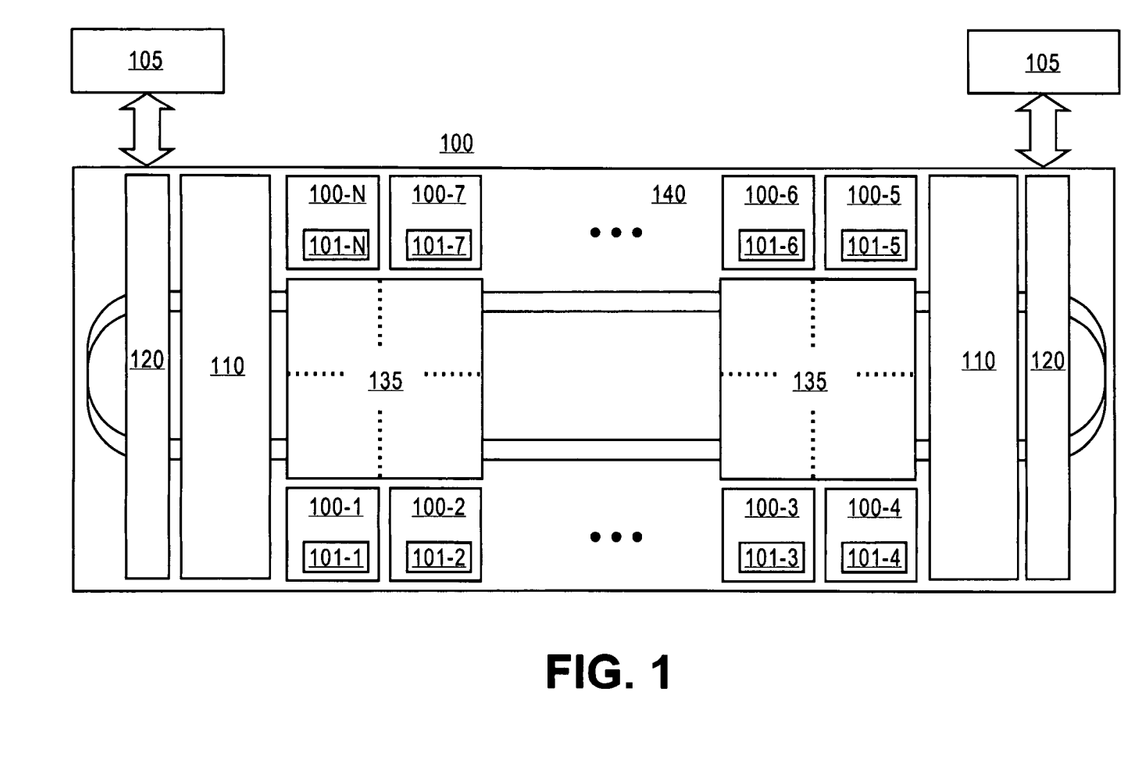
FIG. 1 illustrates a block diagram of a processor capable of performing graphics operations, including at least one embodiment of the invention

FIG. 1 illustrates a processor capable of performing graphics operations, in which at least one embodiment of the invention may be used. In particular, FIG. 1 illustrates a processor that may be used for traditional CPU applications, throughput applications (e.g., 3D graphics applications) or a combination of traditional CPU and throughput applications. Processor 100 includes a number of processing cores 100-1 through 100-N, dedicated throughput application hardware 110 (e.g., graphics texture sampling hardware), memory interface logic 120, organized along a ring interconnect 130. In some embodiments, the processor 100 may include one or more last-level caches 135 that is inclusive of information from caches 101-1 through 101-N within each core 100-1 through 100-N. In one embodiment, one or more processing cores 100-1 through 100-N is able to perform SIMD operations.

Rendering image in parallel using multiple CPUs, or RPUs (Rendering Processing Units), or SPUs or other (semi-) programmable computational cores, may be used in some embodiments. In some embodiments, cores execute programs or procedures (or other type of instruction sequences) performing rendering. Each core can execute several programs or instruction sequences concurrently. We will be calling such programs threads (having in mind any rendering/shading instruction sequences).

Each core may have some amount of cache memory which can be hierarchical (L1 and L2) or just one level, coherent among all units or non coherent, the invention works for any combination of cache properties.

In one embodiment, the distribution of work among threads is performed by dividing a screen space into a number of continuous regions having rectangular shape (e.g. tiles, scanlines, etc.) and assigning some number of those regions to each of the thread. For the sake of simplicity we will call such a region a tile having in mind any screen space region processed by a single computational unit in one piece (the basic portion of image which does not make sense dividing and giving to multiple threads).

In one embodiment, we suggest a technique allowing even distribution of computational load among rendering threads maximizing data coherency in on-core caches. The suggested technique is computationally in-expensive uses atomic synchronization operations (interlocked increment only) and allows for minimization of their usage.

One technique works as follows, according to one embodiment. All tiles in the image space are logically arranged into an ordered sequence according to which a tile has an ordinal number (index) assigned. In one embodiment, the sequence possesses the following properties: the tiles that close in image space should have close indices in the sequence, e.g. tiles are arranged in space filling curve, a computation of tile position on the image (x, y coordinates) using a given index is computationally inexpensive process: (x, y)=ImageXY(T), where T is a tile index.

Figure 2:
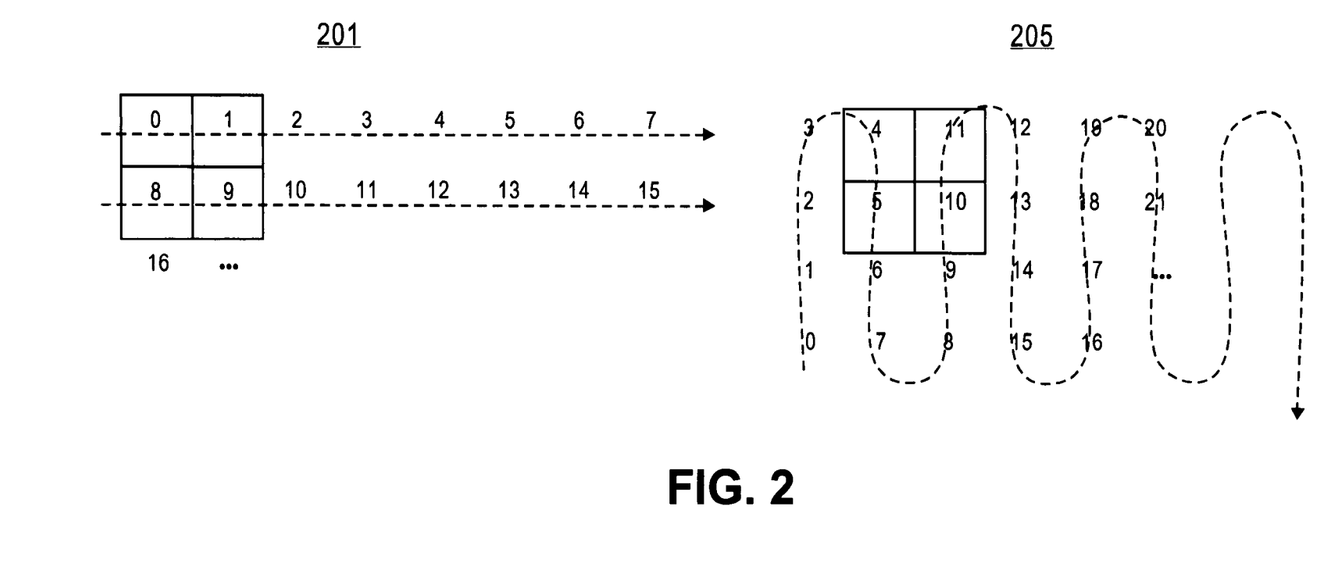
FIG. 2 illustrates a block diagram illustrating two examples of tile sequences, according to at least one embodiment.

Two examples of such sequences are illustrated in FIG. 2. In FIG. 2, chart 201 shows tiles organized in horizontal lines. Chart 205 shows a sequence of tiles organized in 4-tile columns swept in up-down manner, which may be more cache-friendly. The sequence illustrated in chart 205 can use N-tiles high columns, it also can sweep each column set in switching left-to-right/right-to-left order, or can do only one direction. Given the tile index one can compute the tile position on the image knowing image size, tile size and column height. The technique works as well if x and y coordinates on the image are swapped.

In one embodiment, if $N_{tiles}$ is the total number of tiles to be rendered and $N_{threads}$ is the number of threads, then suggested hybrid technique of load balanced rendering of a single frame works as follows:

---

1) Initial static load balancing
   a. All tiles are divided into $N_{threads}$ continuous groups (tile sets). Each group tile set has index of starting tile $S_i$ and number of tiles in it $N_i$, computed in the following manner
      i. $N_i := N_{tiles} / N_{threads} + C_i$ tiles to render, where $C_i$ is a correction coefficient when Nthreads is large and $N_{tiles}$ is not exact multiple of $N_{threads}$ ($C_i = 1$ or 0 depending on static allocation policy for a given thread)
      ii. Starting tile for i-th thread is computed $S_i := N_0 + N_1 + \ldots + N_{i-1}$
   b. Each thread is initially assigned one of the tile sets with number i = 0 ... $N_{threads-1}$ and starting tile for that tile set is stored in per-thread progress counter $P_i := S_i$. Each progress counter is stored in a separate cache line to minimize the cache line thrashing effect thus minimizing the cost of synchronization.
   c. When all ($S_i$, $N_i$) are computed and per-thread progress counters are initialized with the starting tile index, the threads are let go (e.g. spawned, released with a kind of synch primitive, raised from sleep status, etc.). We suggest spawning or creating threads at the rendering application initialization rather than -continued doing this at the beginning of each frame.
2) Rendering loop phase
    d. Atomically increment $P_i$ counter, storing its previous value in a
       local variable R. For example, this step can be performed by
       InterlockedIncrement function provided in OS specific run-time
       library or with lock: xadd operation on IA
    e. If the thread finished rendering its own tiles, i.e. $R >= S_i + N_i$ then
       go to step 3) (dynamic stealing)
    f. Compute image coordinates of tile R: (x, y) := ImageXY(R)
    g. Render the tile R with coordinates (x, y)
    h. Go to step 2) a. (i.e. pick and render next tile)
3) Dynamic stealing phase
    i. Iterate over threads progress counters searching for unfinished
       set of tiles, i.e. for all j = $\{i + 1 \ldots N_{threads-1}, 0 \ldots i - 1\}$
        i. Try to steal a tile from j-th tile set atomically incrementing
           $P_j$ progress counter and storing the previous $P_j$ value in a
           local variable R
        ii. If $R < S_j + N_j$ then i := j and go to step 2) c., i.e. if j-th tile
            set has tiles to render then the thread switches to
            rendering of that j-th tile set
    j. If all tile sets are complete than go to step 4
4) End rendering frame synch point.

In one embodiment, a load balanced parallel rendering technique uses any cache friendly tile sequence (like the ones on FIG. 2.) using data coherency between tiles, as each initial tile set is continuous along the path swept by the sequence. So each core when rendering given tile set will re-use maximum amount of data fetched into its cache from memory. Thus the technique possesses all the nice properties of static load balancing approach.

In one embodiment, the technique eliminates non-even load distribution typical for static approaches. Although tiles have equal number of pixels in them, the geometry rendered into each tile as well as shading techniques can be different in complexity. This causes tiles having strongly variable rendering cost. For example, some of the tiles might have pixels with multiple reflections/refractions, when other tiles have pixels with some simple diffuse surface. Due to the threads ability of switching to dynamic load balancing using stealing when initially assigned tile set is complete the method achieves perfect load balancing typical for dynamic approach.

In one embodiment, a dynamic stealing technique using interlocked counters has minimal cost and thus minimal overhead of load balancing synch primitives. It does not require creation and maintenance of complex data structures like queues with atomic put/get operations. It reduces the synchronization to a single interlocked increment operation.

Small storage size required for each counter allows having as many counters as threads minimizing contention for updating the counter. Since interlocked progress counters may reside in different cache lines the actual synchronization data transmission between the cores is minimized postponing the thrashing effect to the latest stage possible In addition to rendering and ray tracing a technique according to one embodiment, has been shown to work well for parallelization of other applications where tiles of variable processing cost are used, e.g. complex image processing.

Given that the number of tile sets is not necessarily equal to the number of available threads, the suggested technique works optimally with different number of available threads versus total number of tiles. If number of threads is relatively small then number of tile sets can be larger than number of available threads, thus allowing to switch to the dynamic stealing phase at a minimum number of tiles left.

One technique for achieving high performance for a parallel rendering algorithm is to divide the rendering task into a number of tasks that can be load balanced and executed in parallel with very few synchronization points. In one embodiment, a processor, such as the one illustrated in FIG. 1, allows more options for parallelism than typical GPUs due to its flexible memory model and software-controlled scheduling.

For simplicity, we will first consider rendering to a single set of render targets, such as a pixel buffer and a depth/stencil buffer. These render targets and the rendering commands that modify them are together called an Rtset, for the purposes of this disclosure. The rendering commands for an RTset may be specified by graphics APIs as a series of rendering state changes, followed by a batch of triangles rendered using that current device state. Rather than use the concept of a current state internally, some renderers in some embodiments capture the rendering state in a single fully specified structure. It then groups the batches of triangles and tags each batch with the state it uses. This batch of triangles and the state it uses is called a "primitive set" or "PrimSet", for the purposes of this disclosure.

Figure 4:
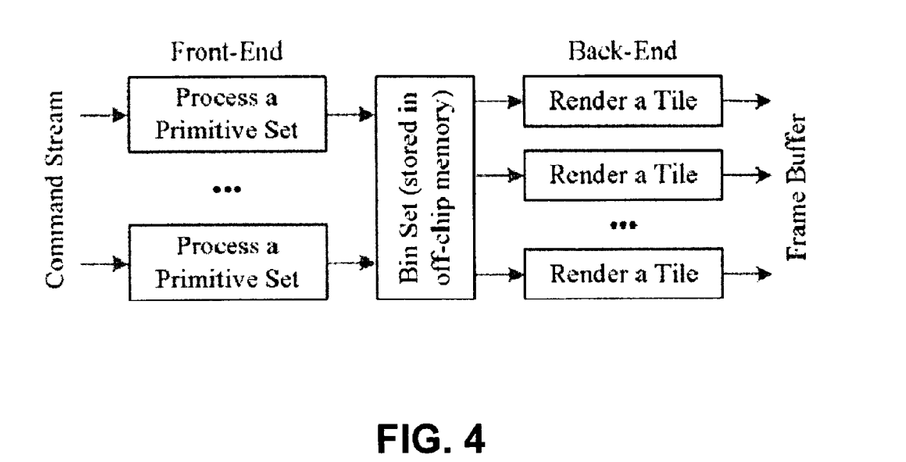
FIG. 4 illustrates the broad structure for rendering the PrimSets of a single Rtset, according to one embodiment.

FIG. 4 shows the broad structure for rendering the PrimSets of a single Rtset, according to one embodiment. In one embodiment, the surface being rendered is split into tiles of pixels. Each tile has a bin that will be filled with the triangles from a PrimSet that intersect that tile. The set of bins for the whole RTset is called a bin set. The distinction in this disclosure between "tile" and "bin", is that a tile is the actual pixel data, while the bin is the set of primitives that affect that tile. In the same way that each tile has a bin, each RTset (set of render target tiles and associated PrimSets) has a single bin set (set of bins that contain the primitives).

In one embodiment, tile size is chosen so that all the target surfaces in the RTset for that tile will fit in a core's L2 cache. Thus an RTset with many color channels, or with large high-precision data formats, will use a smaller tile size than one with fewer or low-precision channels. To simplify the code, tiles may be square and a power-of-two in size, typically ranging in size from 32×32 to 128×128. An application with 32-bit depth and 32-bit color can use a 128×128 tile and only fill half of the core's 256 KB L2 cache subset. As long as a tile fits within the L2 cache, rendering speed does not change very much for different tile sizes. The main impact of using smaller tiles is that some triangles in the scene will hit more than one tile and require processing in each of those tiles—this is termed bin spread. Smaller tiles increase bin spread, but it is not a large increase.

In some modern workloads, we see bin spread of less than 5%. That is, the number of triangles processed across the system is less than 5% higher than the number for a single large bin covering the entire render target. There are two phases to the processing, in one embodiment. In the front-end, each PrimSet is given a sequence ID to identify where in the rendering stream it was submitted. This is used by the back-end to ensure correct ordering, as discussed below. The PrimSet is then assigned to a single core, which performs vertex shading, tessellation, geometry shading, culling and clipping to produce triangles (or other primitives). The core then rasterizes each triangle to determine which tiles it touches and which samples it covers within each of those tiles. The result is a series of X,Y coordinates and sample coverage masks for each triangle. This data is stored in the bins along with indices that reference the vertex data.

Once all front-end processing for the RTset has finished and every triangle has been added to the bin for each tile that it touched, back-end processing is performed. Here, each tile is assigned to a single core, which shades each triangle from the associated bin, including requesting texture sampling from the co-processors. The back-end also performs depth, stencil and blending operations. It is important to note that unlike some other tile-based rendering methods, there is no attempt at perfect occlusion culling before shading, reordering of shading, or any other non-standard rendering methods. When taking commands from a DirectX or OpenGL command stream, rendering for a single tile is performed in the order in which the commands are submitted.

Using a conventional rendering pipeline within each tile may avoid surprises in either functionality or performance and works consistently well across a broad spectrum of existing applications.

Tile size may be chosen so that all the target surfaces in the RTset for that tile will fit in a core's L2 cache. Thus an RTset with many color channels, or with large high-precision data formats, will use a smaller tile size than one with fewer or low-precision channels. To simplify the code, tiles are usually square and a power-of-two in size, typically ranging in size from 32×32 to 128×128. An application with 32-bit depth and 32-bit color can use a 128×128 tile and only fill half of the core's 256KB L2 cache subset. As long as a tile fits within the L2 cache, rendering speed does not change very much for different tile sizes. One advantage of using smaller tiles is that some triangles in the scene will hit more than one tile and require processing in each of those tiles—this is termed "bin spread", for the purposes of this disclosure. Smaller tiles increase bin spread, but it is not a large increase. Typically we see bin spread of less than 5% in modern workloads. That is, the number of triangles processed across the system is less than 5% higher than the number for a single large bin covering the entire render target. There are two phases to the processing. In the front-end, each PrimSet is given a sequence ID to identify where in the rendering stream it was submitted. This is used by the back-end to ensure correct ordering, as discussed below. The PrimSet is then assigned to a single core, which performs vertex shading, tessellation, geometry shading, culling and clipping to produce triangles (or other primitives). The core then rasterizes each triangle to determine which tiles it touches and which samples it covers within each of those tiles. The result is a series of X,Y coordinates and sample coverage masks for each triangle. This data is stored in the bins along with indices that reference the vertex data. Once all front-end processing for the RTset has finished and every triangle has been added to the bin for each tile that it touched, back-end processing is performed. Here, each tile is assigned to a single core, which shades each triangle from the associated bin, including requesting texture sampling from the co-processors. The back-end also performs depth, stencil and blending operations. Using a conventional rendering pipeline within each tile avoids surprises in either functionality or performance and works consistently well across a broad spectrum of existing applications. A single frame consists of a sequence of rendering commands, each sent to a set of rendering surfaces. Modem applications may use multiple pixel targets at once, and may change targets frequently during a single frame in order to render effects such as reflections and shadow maps. To handle different sets of render targets within a single frame, one embodiment starts by creating a graph where each node corresponds to an Rtset. Each node is then assigned the PrimSets that modify that node's set of render targets. When an RTset uses a render target (e.g. a texture) that is used by subsequent rendering operations to a different target, a dependency is set up between the two RTsets. For example, in shadow mapping, the main RTset for a scene (the back buffer and depth/stencil buffer) has a dependency on the RTset for each of the shadow maps used. Once the dependency graph is created, the nodes can be selected for rendering in any order that satisfies the dependencies.

Figure 5:
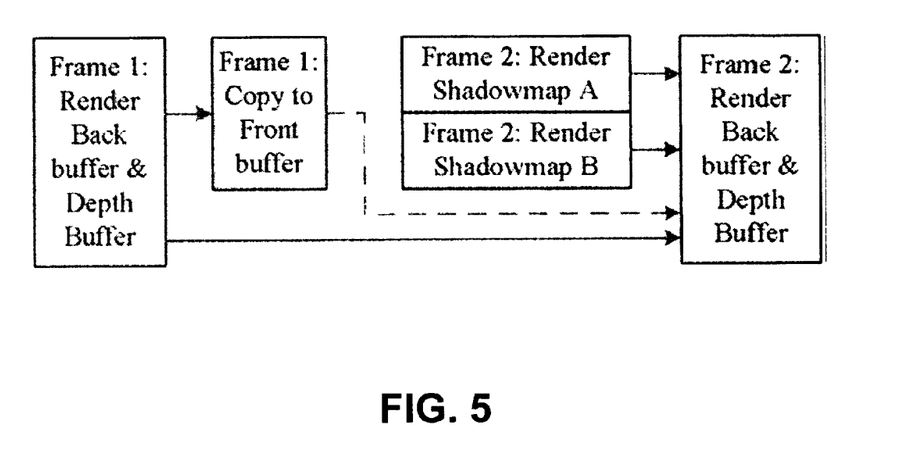
FIG. 5 illustrates a dependency graph for two frames of a scene that requires rendering two shadow maps.

FIG. 5 shows a dependency graph for two frames of a scene that requires rendering two shadow maps. For simplicity, the shadow maps for frame 1 are not shown. Frame 2 of the scene cannot be rendered until after frame 2's shadow maps are rendered. Since each frame in this simple example uses the same memory for the back buffer and depth buffer, frame 2 also cannot be rendered until frame 1's scene is rendered and copied to the front buffer (the dotted line dependency). However, rendering the frame 2 shadow maps can overlap with frame 1 rendering, since there are no dependencies.

Using a different back buffer for frame 2 would remove the dotted line dependency. This substitution can be done automatically. Note that the PrimSets associated with an RTset can be divided into multiple subsets whenever required, so long as ordering is maintained. An RTset can be split if it is too large to be efficiently processed as one unit, e.g. to provide finer scheduling granularity. Not all cores of processor in FIG. 1 need to process PrimSets from the same RTset at the same time. This ability to arbitrarily split and schedule RTsets avoids the limitations of some previous tiling architectures.

Since graphics rendering commands modify state, the order of execution matters, in one embodiment. Typical graphics processors process these commands sequentially, so that the commands are started in order and finished in order. When operations within a rendering command are parallelized over the inputs, the outputs must be put back in order. Geometry shaders, where the number of outputs is variable, require
particularly large FIFOs to maintain order and minimize stalls. In one embodiment, a processor, such as that depicted in FIG. 1 allows front-end processing of multiple PrimSets in parallel. A control processor decides which PrimSets to render at any particular time, according to the dependencies in the Rtset graph, and adds those PrimSets to an active list. The processor cores doing front-end work take PrimSets from this active list. Each core works on its own PrimSet independently, in one embodiment.

Figure 6:
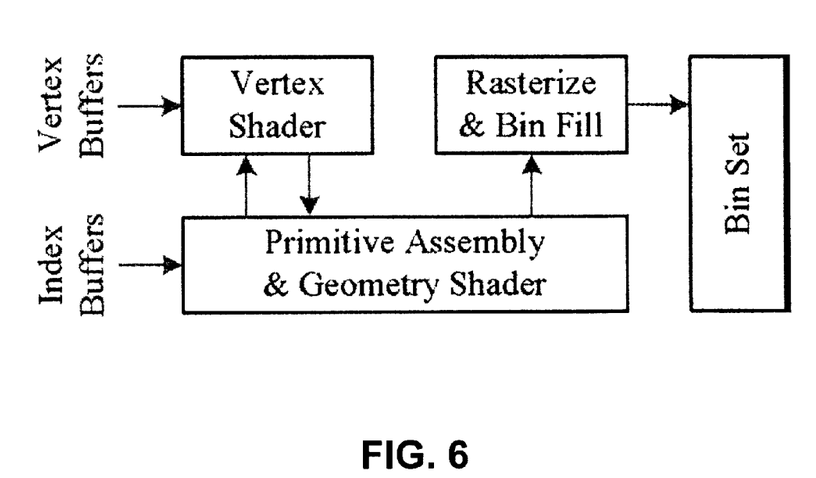
FIG. 6 illustrates the processing stages within a single front-end core.

When the core is finished, it takes the next from the active list. Each core uses its own subset of the bin for each tile, so that it need not contend for locks with the other front-end cores. The PrimSet's sequence ID is written into the bins so that the back-end can restore the original order by always reading primitives from the sub-bin with the smallest sequence ID. FIG. 6 shows the processing stages within a single front-end core.

The first step identifies the vertices that form each primitive. This can be complex due to index buffers that allow arbitrary mappings of vertices in a vertex buffer to primitives, e.g. to efficiently store meshes. Next, the required vertices are transformed by running the vertex shader on them if they haven't already been transformed. Transformed vertices are streamed out to main memory.

Values other than the position data are actively evicted from the L2 cache to avoid pollution, as they are not needed again until interpolant setup in the back end. After this, the geometry shader is run, followed by frustum and back-face culling, then clipping.

The above describes at least one embodiment that computes coverage
information in the front-end and puts it into the bins. This ensures good load balancing, even if a small number of bins contain a large number of triangles. Rasterization can occur in either the front-end or the back-end.

Figure 3:
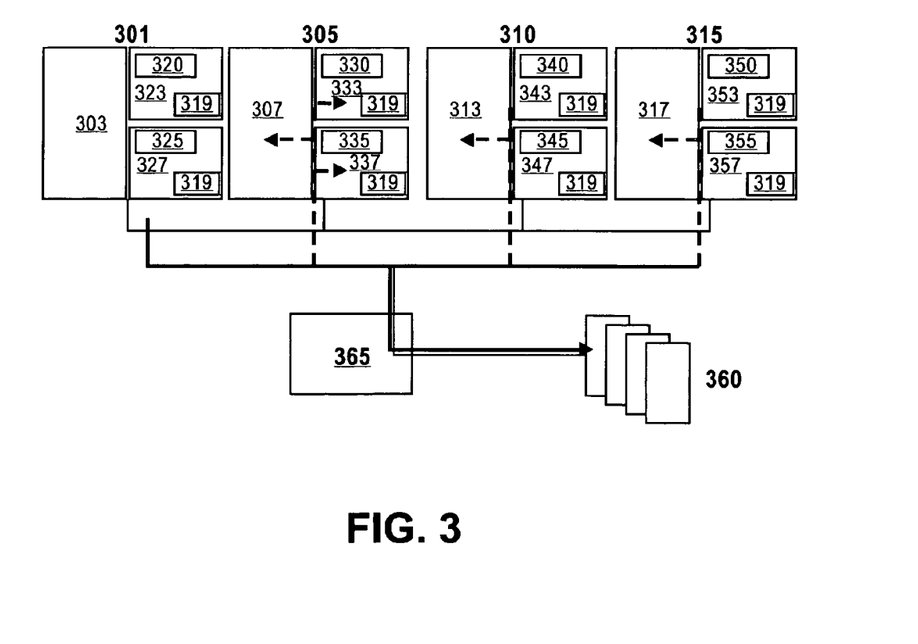
FIG. 3 illustrates a shared bus interconnect computer system, in which at least one embodiment may be used.

FIG. 3, for example, illustrates a front-side-bus (FSB) computer system in which one embodiment of the invention may be used. Any processor 301, 305, 310, or 315 may access information from any local level one (L1) cache memory 320, 325, 330, 335, 340, 345, 350, 355 within or otherwise associated with one of the processor cores 323, 327, 333, 337, 343, 347, 353, 357. Furthermore, any processor 301, 305, 310, or 315 may access information from any one of the shared level two (L2) caches 303, 307, 313, 317 or from system memory 360 via chipset 365. One or more of the processors in FIG. 3 may include or otherwise be associated with logic 319 to promote load balancing among parallel rendering threads, according to at least one embodiment.

Figure 7:
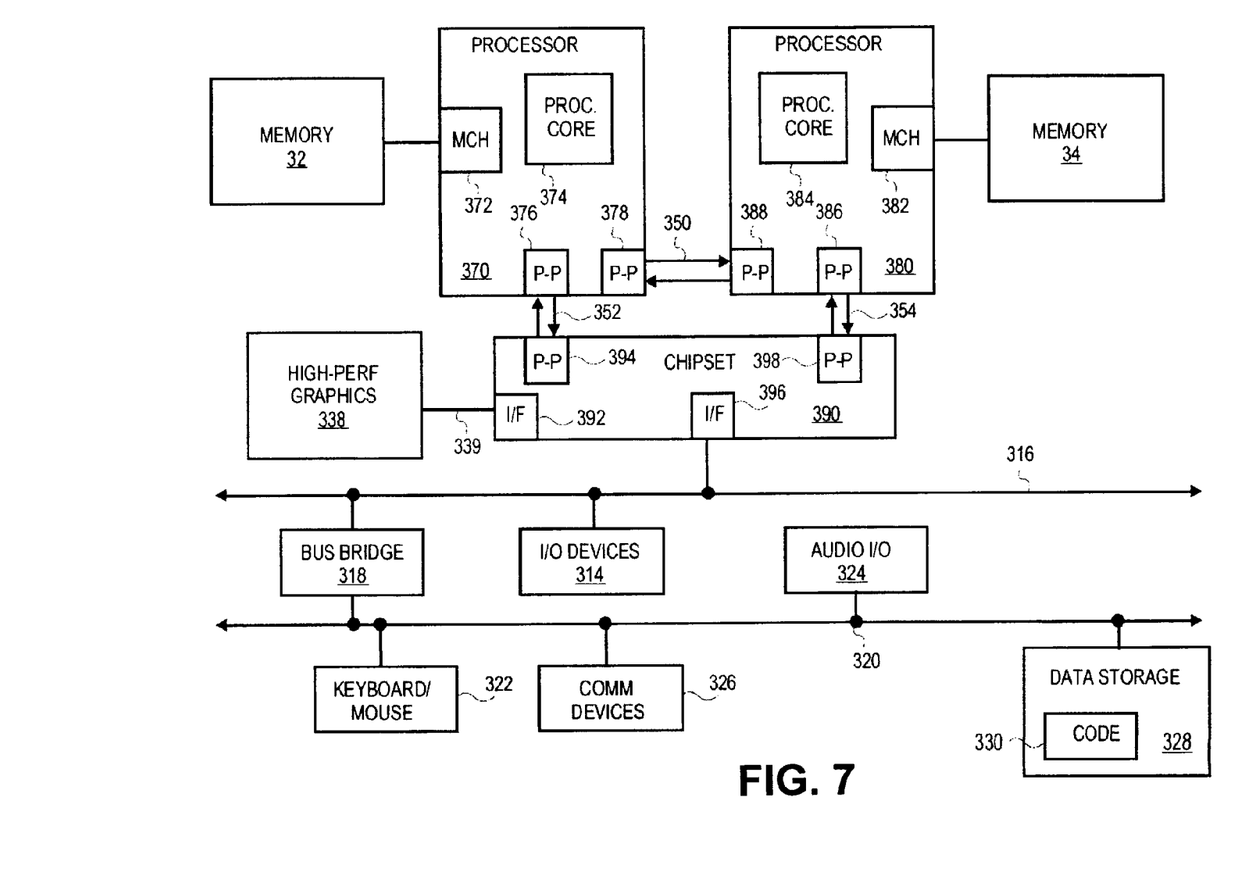
FIG. 7 illustrates a block diagram of a point-to-point interconnect computer system, in which at least one embodiment of the invention may be used.

In addition to the FSB computer system illustrated in FIG. 3, other system configurations may be used in conjunction with various embodiments of the invention, including point-to-point (P2P) interconnect systems and ring interconnect systems. The P2P system of FIG. 7, for example, may include several processors, of which only two, processors 670, 680 are shown by example. Processors 670, 680 may each include a local memory controller hub (MCH) 672, 682 to connect with memory 62, 64. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 7. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
a processor to process a screen space by dividing the screen space into tiles, assigning the tiles to different threads, enabling the threads to be executed in parallel, assigning an ordinal sequence number to each tile, in addition to identifying each tile by its coordinates, such that the sequence number defines a sequence that moves continuously in a regular, repeated pattern from contiguous tile to contiguous tile, and determining a tile's position in screen space using its sequence number; and
a memory coupled to said processor.

2. The apparatus of claim 1 wherein said pattern moves from one row to a subsequent row.

3. The apparatus of claim 1 wherein said sequence moves from one column to the next column.

4. The apparatus of claim 1 wherein said processor to assign equal numbers of pixels to each tile.

5. The apparatus of claim 1 wherein said processor to reassign a tile from one thread to another thread when the another thread finishes processing a part before the one thread.

6. The apparatus of claim 1, said processor to render tiles having substantial data coherency among the corresponding tiles.

* * * * *